(12) United States Patent
Lundin

(10) Patent No.: US 8,537,754 B2
(45) Date of Patent: *Sep. 17, 2013

(54) NETWORK REQUESTED PACKET DATA PROTOCOL CONTEXT ACTIVATION

(75) Inventor: Niklas Lundin, Göteborg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 225 days.

This patent is subject to a terminal disclaimer.

(21) Appl. No.: 13/090,797

(22) Filed: Apr. 20, 2011

(65) Prior Publication Data

US 2011/0194497 A1    Aug. 11, 2011

Related U.S. Application Data

(63) Continuation of application No. 10/416,743, filed on May 13, 2003, now Pat. No. 7,957,393.

(30) Foreign Application Priority Data

Nov. 14, 2000  (SE) ....................... 0004178
Nov. 13, 2001  (WO) ....................... PCT/SE01/02526

(51) Int. Cl.
*H04W 60/00*    (2009.01)

(52) U.S. Cl.
USPC ........................................ 370/328

(58) Field of Classification Search
USPC .............. 370/310, 328, 338, 351, 389, 395.1, 370/395.2, 395.21
See application file for complete search history.

(56) References Cited

U.S. PATENT DOCUMENTS

| | | | |
|---|---|---|---|
| 6,615,269 B1* | 9/2003 | Suumaki et al. | 709/230 |
| 6,636,502 B1* | 10/2003 | Lager et al. | 370/352 |
| 6,683,853 B1* | 1/2004 | Kannas et al. | 370/237 |
| 7,609,700 B1* | 10/2009 | Ying et al. | 370/395.21 |
| 7,957,393 B2* | 6/2011 | Lundin | 370/395.21 |
| 2004/0037269 A1 | 2/2004 | Lundin | |

* cited by examiner

*Primary Examiner* — Chi Pham
*Assistant Examiner* — Robert Lopata

(57) ABSTRACT

A packet switched (PS) core network (CN) supporting several quality of services levels, comprising at least a serving node (SGSN), a gateway node (GGSN), a home location register (HLR), a short message service gateway and interworking unit (SMS-GMSC, SMS-IWMSC), charging gateway functionality (CGF), and a public data network (PDN) comprising an application server (AS). The core network is adapted for carrying out a packet data protocol (PDP) context activation in which a PDP address is assigned to a mobile station and in which a given quality of service is assigned through the network in a communication session between the mobile station and the application processor in question, whereby the application server (AS) initiates a context activation in which the QoS is seeked altered for the mobile station.

8 Claims, 5 Drawing Sheets

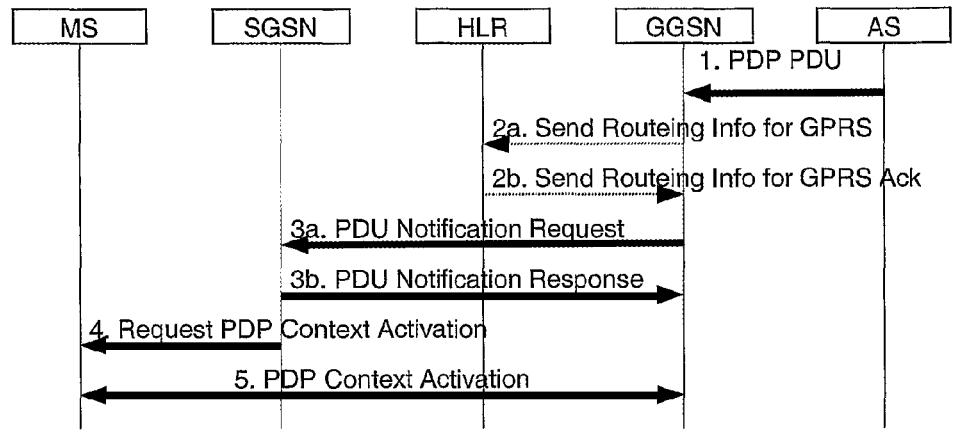
Fig. 3 (Prior Art)    ......... One or more events
                      ———— Single event
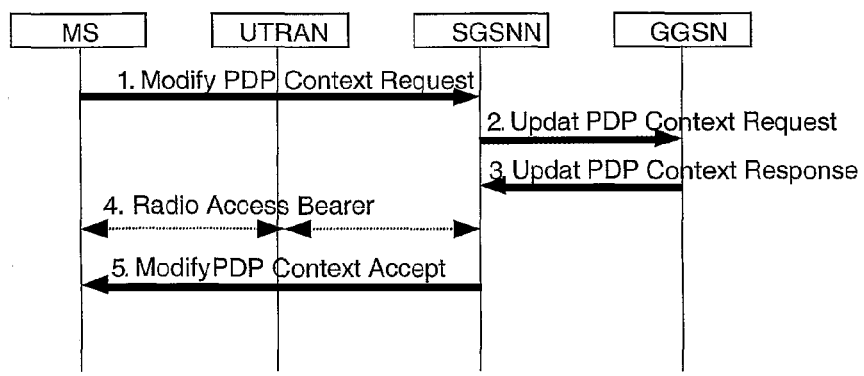
Fig. 4 (Prior Art)    ......... One or more events
                      ———— Single event ——— One or more events
——— Single event ——— One or more events
——— Single event

NETWORK REQUESTED PACKET DATA PROTOCOL CONTEXT ACTIVATION

This application is a continuation application which claims the benefit of U.S. patent application Ser. No. 10/416,743 filed on May 13, 2003, now U.S. Pat. No. 7,957,393 the disclosure of which is fully incorporated herein by reference.

FIELD OF THE INVENTION

The present invention relates to a method for a packet data and telecommunication systems, comprising wireless and wireline sub-networks. The invention concerns in particular a method for a PDP (Packet Data Protocol) context activation procedure in a core network based on GSM (Global System for Mobile telephony), GPRS (General Packet radio System) and UMTS (Universal Mobile Telephony System) elements.

BACKGROUND OF THE INVENTION

According to the 3'rd generation partnership project (3GPP) technical specification, 3G TS 23.060 v3.4.0 (2000-07) a common packet domain Core Network is used for both GSM and UMTS. Such a system has been shown in FIG. 1. A similar system has been shown in WO99/05828.

The above Core Network provides packet-switched (PS) services and is designed to support several quality of services levels in order to allow efficient transfer of non real-time traffic (e.g., intermittent and bursty data transfers, occasional transmission of large volumes of data) and real-time traffic (e.g., voice, video). One class of quality of service pertains to a low throughput and a low delay; another class pertains to higher throughput and longer delay and a further class pertains to relatively long delays and high through-put.

Applications based on standard data protocols and SMS are supported, and interworking is defined with IP networks. Charging is rendered flexible and allows Internet Service Providers to bill according to the amount of data transferred, the QoS supported, and the duration of the connection.

Each PLMN has two access points, the radio interface (labelled Um in GSM and Uu in UMTS) used for mobile access and the R reference point used for origination or reception of messages.

An interface differs from a reference point in that an interface is defined where specific information is exchanged and needs to be fully recognised. There is an inter PLMN interface called Gp that connects two independent packet domain networks for message exchange. There is also a PLMN to fixed network (typically a packet data network) reference point called Gi.

There may be more than a single network interface to several different packet data (or other) networks. These networks may both differ in ownership as well as in communications protocol (e.g., TCP/IP etc.). The network operator should define and negotiate interconnect with each external (PDN or other) network.

Network interworking is required whenever a packet domain PLMN and any other network are involved in the execution of a service request. With reference to FIG. 1, inter-working takes place through the Gi reference point and the Gp interface.

The internal mechanism for conveying the PDP (Packet Data Protocol) PDU (Packet Data Unit) through the PLMN is managed by the PLMN network operator and is not apparent to the data user. The use of the packet domain data service may have an impact on and increase the transfer time normally found for a message when communicated through a fixed packet data network.

The packet domain supports interworking with networks based on the Internet protocol (IP). The packet domain may provide compression of the TCP/IP header when an IP datagram is used within the context of a TCP connection.

The packet domain PLMN service is an IP domain, and mobile terminals offered service by a service provider may be globally addressable through the network operator's addressing scheme.

A GPRS Support Node (GSN) contains functionality required to support GPRS functionality for GSM and/or UMTS. In one PLMN, there may be more than one GSN.

The Gateway GPRS Support Node (GGSN) is the node that is accessed by the packet data network due to evaluation of the PDP address. It contains routing information for PS-attached users. The routing information is used to tunnel N-PDUs to the MS's current point of attachment, i.e., the Serving GPRS Support Node. The GGSN may request location information from the HLR via the optional Gc interface. The GGSN is the first point of PDN interconnection with a GSM PLMN supporting GPRS (i.e., the Gi reference point is supported by the GGSN). GGSN functionality is common for GSM and UMTS.

The Serving GPRS Support Node (SGSN) is the node that is serving the MS. The SGSN supports GPRS for GSM (i.e., the Gb interface is supported by the SGSN) and/or UMTS (i.e., the Iu interface is supported by the SGSN).

In order to access the PS services, an MS shall first make its presence known to the network by performing a GPRS Attach. This makes the MS available for SMS over PS, paging via the SGSN, and notification of incoming PS data. According to the Attach, the IMSI (International Mobile Subscription Identity) of the mobile station (MS) is mapped to one or more packet data protocol addresses (PDP).

At PS Attach, the SGSN establishes a mobility management context containing information pertaining to e.g., mobility and security for the MS.

In order to send and receive PS data, the MS shall activate the Packet Data Protocol context that it wants to use. This operation makes the MS known in the corresponding GGSN, and interworking with external data networks can commence.

At PDP Context Activation, the SGSN establishes a PDP context, to be used for routing purposes, with the GGSN that the subscriber will be using.

The SGSN and GGSN functionalities may be combined in the same physical node, or they may reside in different physical nodes. SGSN and GGSN contain IP or other (operator's selection, e.g., ATM-SVC) routing functionality, and they may be interconnected with IP routers. In UMTS, the SGSN and RNC may be interconnected with one or more IP routers. When SGSN and GGSN are in different PLMNs, they are interconnected via the Gp interface. The Gp interface provides the functionality of the Gn interface, plus security functionality required for inter-PLMN communication. The security functionality is based on mutual agreements between operators.

The SGSN may send location information to the MSC/VLR via the optional Gs interface.

The SGSN may receive paging requests from the MSC/VLR via the Gs interface.

According to the PDP context activation, a network bearer (IP) communication between the mobile station and the Internet service provider (ISP) is established. Moreover, a given class of Quality of Service class is assigned for the communication to be performed.

The Charging Gateway Functionality (CGF) collects charging records from SGSNs and GGSNs. The HLR (Home Location Register) contains GSM and UMTS subscriber information. The HLR stores the IMSI (International Mobile Subscription Identity) and maps the IMSI to one or more packet data protocol addresses (PDP) and maps each PDP address to one or more GGSN's.

The SMS-GMSCs and SMS-IWMSCs support SMS transmission via the SGSN. Optionally, the MSC/VLR can be enhanced for more-efficient co-ordination of packet-switched and circuit-switched services and functionality: e.g., combined GPRS and non-GPRS location updates.

User data is transferred transparently between the MS and the external data networks with a method known as encapsulation and tunnelling: data packets are equipped with PS-specific protocol information and transferred between the MS and the GGSN. This transparent transfer method lessens the requirement for the PLMN to interpret external data protocols, and it enables easy introduction of additional interworking protocols in the future.

An Application Server (AS) is connected to the Packet Data Network (PDN) for providing information. The application server may be owned by an Internet Service Provider (ISP), the PLMN, or an independent company.

MS Initiated PDP Context Activation

We shall now revert to the PDP context activation procedure.

In FIG. 2, a sequence diagram relating to the Mobile Station initiated context activation procedure has been shown.

1) The MS sends an Activate PDP Context Request (NSAPI, TI, PDP Type, PDP Address, Access Point Name, QoS Requested, PDP Configuration Options) message to the SGSN. The MS may use Access Point Name to select a reference point to a certain external network and/or to select a service. QoS Requested indicates the desired QoS profile.

3) In UMTS, RAB (Radio Bearer) set-up is done by the RAB Assignment procedure.

4) If BSS trace is activated, then the SGSN shall send an Invoke Trace (Trace Reference, Trace Type, Trigger Id) message to the BSS or UTRAN. Trace Reference and Trace Type are copied from the trace information received from the HLR. Thereby, the location of the mobile station can be established.

5a) The SGSN validates the Activate PDP Context Request using PDP Type (optional), PDP Address (optional), and Access Point Name (optional) provided by the MS and the PDP context subscription records The SGSN may restrict the requested QoS attributes given its capabilities, the current load, and the subscribed QoS profile.

The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, PDP Configuration Options) message to the affected GGSN 5b) The GGSN creates a new entry in its PDP context table and generates a Charging Id. The new entry allows the GGSN to route PDP PDUs between the SGSN and the external PDP network, and to start charging. The GGSN then returns a Create PDP Context Response (TEID, PDP Address, PDP Configuration Options, QoS Negotiated, Charging Id, Cause) message to the SGSN.

6) The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the MS. The SGSN is now able to route PDP PDUs between the GGSN and the MS, and to start charging.

7) Now, a packet data session is open between the Mobile Station (MS) and the Application Server (AS).

For each PDP Address, a different quality of service (QoS) profile may be requested. For example, some PDP addresses may be associated with E-mail that can tolerate lengthy response times. Other applications cannot tolerate delay and demand a very high level of throughput, interactive applications being one example. These different requirements are reflected in the QoS profile. If a QoS profile requirement is beyond the capabilities of a PLMN, the PLMN negotiates the QoS profile as close as possible to the requested QoS profile. The MS either accepts the negotiated QoS profile, or deactivates the PDP context.

AS Initiated PDP Context Activation

The scenario for setting up a session initiated by the an external application server has been illustrated by the sequence diagram shown in FIG. 3:

The Network-Requested PDP Context Activation procedure allows the GGSN to initiate the activation of a PDP context. When receiving a PDP PDU the GGSN checks if a PDP context is established for that PDP address. If no PDP context has been previously established the GGSN may try to deliver the PDP PDU by initiating the Network-Requested PDP Context Activation procedure.

1) When receiving a PDP PDU the GGSN determines if the Network-Requested PDP Context Activation procedure has to be initiated. The GGSN may store subsequent PDP PDU's received for the same PDP address.

2a) The GGSN may send a Send Routing Information for GPRS (IMSI) message to the HLR.

2b) If the HLR determines that the request can be served, it returns a Send Routing Information for GPRS Ack (IMSI, SGSN Address, Mobile Station Not Reachable Reason) message to the GGSN.

3a) The GGSN shall send a PDU Notification Request (IMSI, PDP Type, PDP Address, APN) message to the SGSN indicated by the HLR.

3b) The SGSN returns a PDU Notification Response (Cause) message to the GGSN in order to acknowledge that it shall request the MS to activate the PDP context indicated with PDP Address.

4) The SGSN sends a Request PDP Context Activation (TI, PDP Type, PDP Address, APN) message to request the MS to activate the indicated PDP context.

5) The PDP context is activated with the PDP Context Activation procedure.

As mentioned above, it is possible that the mobile station needs a different QoS from what was initially needed. In order to modify the QoS, the mobile station may take one of the following steps:

The MS initiates a new primary PDP Context.

There is an active PDP context, but it is established with insufficient bandwidth, QoS. The MS may trigger a PDP Context Modification.

There is an active PDP context, but it is established with insufficient bandwidth, QoS. The MS may trigger a secondary PDP Context Modification.

The two latter procedures shall be dealt with below.

In FIG. 4, a procedure of the mobile station modifying the PDP context is shown in which the following steps are carried out:

1) The MS sends a Modify PDP Context Request (TI, QoS Requested, TFT) message to the SGSN. Either QoS Requested or TFT or both may be included. QoS Requested indicates the desired QoS profile, while TFT indicates the TFT that is to be added or modified or deleted from the PDP context.

2) The SGSN may restrict the desired QoS profile given its capabilities, the current load, and the subscribed QoS profile. The SGSN sends an Update PDP Context Request (TEID, NSAPI, QoS Negotiated, TFT) message to the GGSN. If QoS Negotiated and/or TFT received from the SGSN is incompatible with the PDP context being modified (e.g., TFT contains inconsistent packet filters), then the GGSN rejects the Update PDP Context Request. The compatible QoS profiles are configured by the GGSN operator.

3) The GGSN may further restrict QoS Negotiated given its capabilities and the current load. The GGSN stores QoS Negotiated, stores, modifies, or deletes TFT of that PDP context as indicated in TFT, and returns an Update PDP Context Response (TEID, QoS Negotiated) message.

4) In UMTS, radio access bearer modification may be performed by the RAB Assignment procedure.

5) The SGSN selects Radio Priority and Packet Flow Id based on QoS Negotiated, and returns a Modify PDP Context Accept (TI, QoS Negotiated, Radio Priority, Packet Flow Id) message to the MS.

In FIG. 5, a procedure for activation of a secondary PDP context has been shown in which the following steps are carried out:

1) The MS sends an Activate Secondary PDP Context Request (Linked TI, NSAPI, TI, QoS Requested, TFT) message to the SGSN. Linked TI indicates the TI value assigned to any one of the already activated PDP contexts for this PDP address and APN. QoS Requested indicates the desired QoS profile. TFT is sent transparently through the SGSN to the GGSN to enable packet classification for downlink data transfer. TI and NSAPI contain values not used by any other activated PDP context.

2) In GSM, security functions may be executed.

3) In UMTS, RAB set-up is done by the RAB Assignment procedure.

4a) The SGSN validates the Activate Secondary PDP Context Request using the TI indicated by Linked TI. The same GGSN address is used by the SGSN as for the already-activated PDP context(s) for that TI and PDP address.

The SGSN and GGSN may restrict and negotiate the requested QoS. The SGSN sends a Create PDP Context Request (QoS Negotiated, TEID, NSAPI, Primary NSAPI, TFT) message to the affected GGSN. Primary NSAPI indicates the NSAPI value assigned to any one of the already activated PDP contexts for this PDP address and APN. TFT is included only if received in the Activate Secondary PDP Context Request message. The GGSN uses the same external network as used by the already-activated PDP context(s) for that PDP address, generates a new entry in its PDP context table, and stores the TFT. The new entry allows the GGSN to route PDP PDUs via different GTP tunnels between the SGSN and the external PDP network.

4b) The GGSN returns a Create PDP Context Response (TEID, QoS Negotiated, Cause) message to the SGSN.

In GSM, BSS packet flow context procedures may be executed.

5) The SGSN selects Radio Priority and Packet Flow Id based on QoS Negotiated, and returns an Activate Secondary PDP Context Accept (TI, QoS Negotiated, Radio Priority, Packet Flow Id) message to the MS. The SGSN is now able to route PDP PDUs between the GGSN and the MS via different GTP tunnels and possibly different LLC links.

Push Services

One type of service which can be accomplished in the above system is so-called "push" services, that is, an Application Server (AS) takes the initiative to render information, such as stock quotes, news or commercials, available to one or a plurality of mobile terminals.

SUMMARY OF THE INVENTION

It is a first object of the present invention to set forth a method for effectively assigning a given quality of service to a server initiated communication session.

This object has been accomplished by the subject matter set forth in claim 1.

Further advantages will appear from the following detailed description and the drawings.

DETAILED DESCRIPTION OF PREFERRED EMBODIMENTS OF THE INVENTION

First Embodiment

Figure 6:
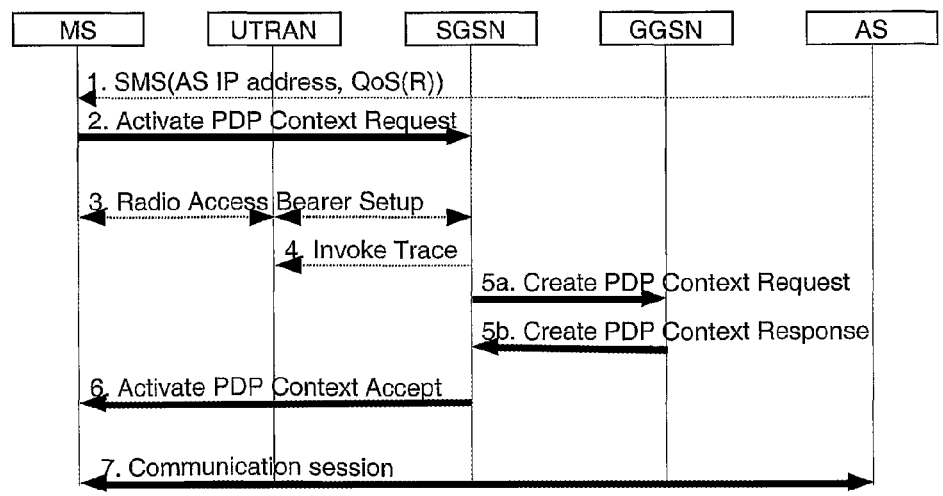

The scenario for setting up a session initiated by an external application server, when QoS has been included in the communication between the AS and the MS (by SMS), is illustrated by the sequence diagram shown in FIG. 6:

1) A push request is sent to the MS through an SMS message, asking for a session with a certain QoS, the QoS (R). The MS does not have an active PDP Context. Delivery of the SMS involves the nodes SC, SMS-GMSC, HLR and SGSN.
2) The MS sends an Activate PDP Context Request (NSAPI, TI, PDP Type, PDP Address, Access Point Name, QoS Requested, PDP Configuration Options) message to the SGSN. The MS may use Access Point Name to select a reference point to a certain external network and/or to select a service. QoS Requested indicates the desired QoS profile.
3) In UMTS, RAB (Radio Bearer) set-up is done by the RAB Assignment procedure.
4) If BSS trace is activated, then the SGSN shall send an Invoke Trace (Trace Reference, Trace Type, Trigger Id, OMC Identity) message to the BSS or UTRAN. Trace Reference, and Trace Type are copied from the trace information received from the HLR or OMC.
5a) The SGSN validates the Activate PDP Context Request using PDP Type (optional), PDP Address (optional), and Access Point Name (optional) provided by the MS and the PDP context subscription records
The SGSN may restrict the requested QoS attributes given its capabilities, the current load, and the subscribed QoS profile.
The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, OMC Identity, PDP Configuration Options) message to the affected GGSN
The GGSN creates a new entry in its PDP context table and generates a Charging Id. The new entry allows the GGSN to route PDP PDUs between the SGSN and the external PDP network, and to start charging.
5b) The GGSN then returns a Create PDP Context Response (TEID, PDP Address, PDP Configuration Options, QoS Negotiated, Charging Id, Cause) message to the SGSN.
6) The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the MS. The SGSN is now able to route PDP PDUs between the GGSN and the MS, and to start charging.
7) Now, a packet data session is open between the Mobile Station (MS) and the Application Server (AS).

It follows from the above procedure, that the service of quality requested by the application server is communicated in the initial request towards the mobile station.

Second Embodiment

Figure 7:
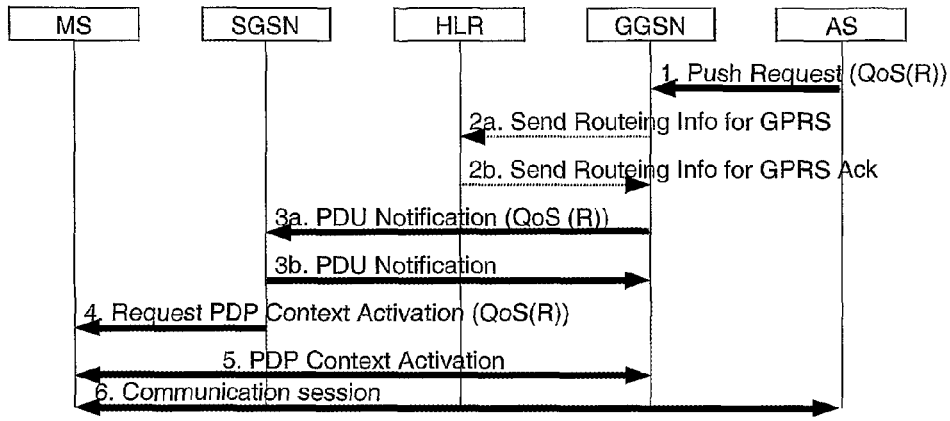

The scenario for setting up a session initiated by an external application server, when QoS has been included in the communication between the AS and the GGSN (by some protocol), is illustrated by the sequence diagram shown in FIG. 7 (only the new points are mentioned here)

Figure 1:
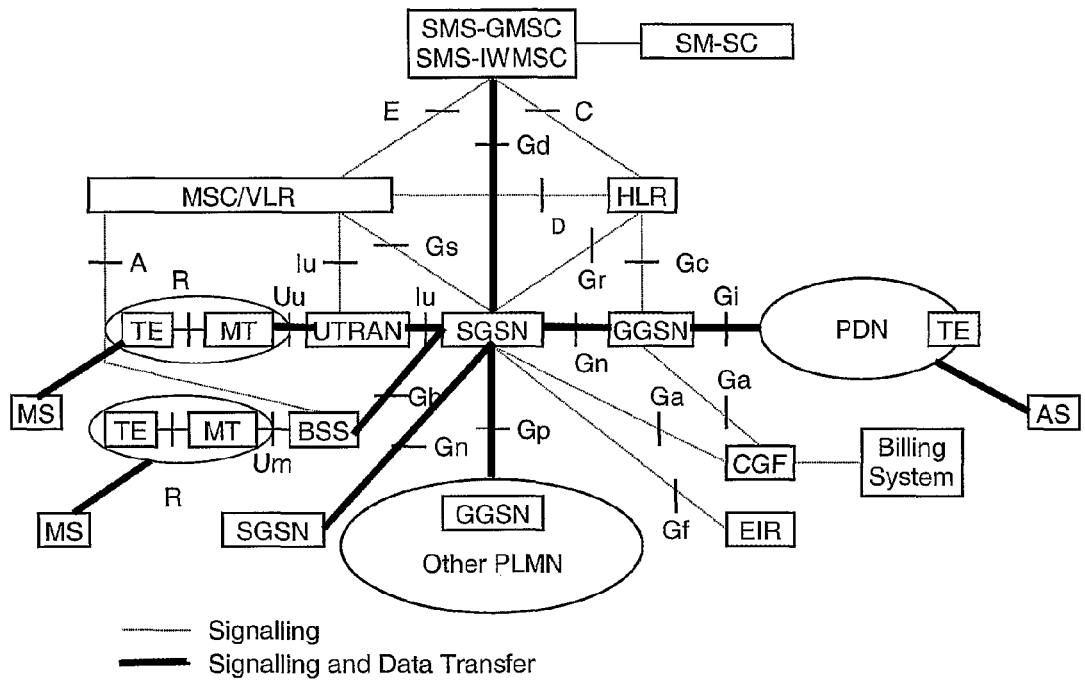
FIG. 1 shows a prior art common packet domain core network for GSM and UMTS use, FIG. 2 discloses a sequence diagram for a known context activation procedure initiated by a mobile station, FIG. 3 discloses a sequence diagram for a known context activation procedure initiated by an application server, FIG. 4 discloses a sequence diagram for a known procedure initiated by the mobile station for modifying the PDP context, FIG. 5 discloses a sequence diagram for a known procedure initiated by the mobile station for a secondary modification of the PDP context, FIG. 6 discloses a sequence diagram for a first embodiment of a context activation procedure initiated by an application server according to the invention. The MS is contacted with an SMS message, including the QoS(R), which in turn triggers the MS to start the PDP Context Activation procedure, FIG. 7 discloses a sequence diagram for a second embodiment of a context activation procedure initiated by an application server according to the invention. The GGSN receives a push request, including the QoS(R), from the AS, FIG. 8 discloses a sequence diagram for a third embodiment of a context activation procedure initiated by an application server according to the invention. The GGSN receives an incoming PDU from which the GGSN can deduce the QoS(R) (e.g., mapping of the ds-byte of the IP-header to the defined corresponding QoS(R)), FIG. 9 discloses a sequence diagram for a fourth embodiment of a context activation procedure initiated by an application server according to the invention. The MS is contacted with an SMS message, including the QoS(R). The MS chooses to trigger the PDP Context Modification procedure, and FIG. 10 discloses a sequence diagram for a fifth embodiment of a context activation procedure initiated by an application server according to the invention. The MS is contacted with an SMS message, including the QoS(R). The MS chooses to initiate a secondary PDP Context.
Figure 2:
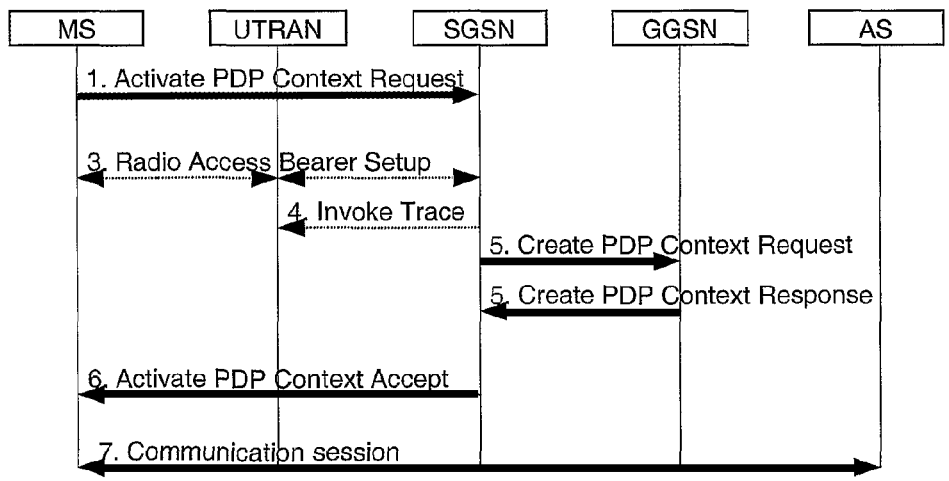
Figure 5:
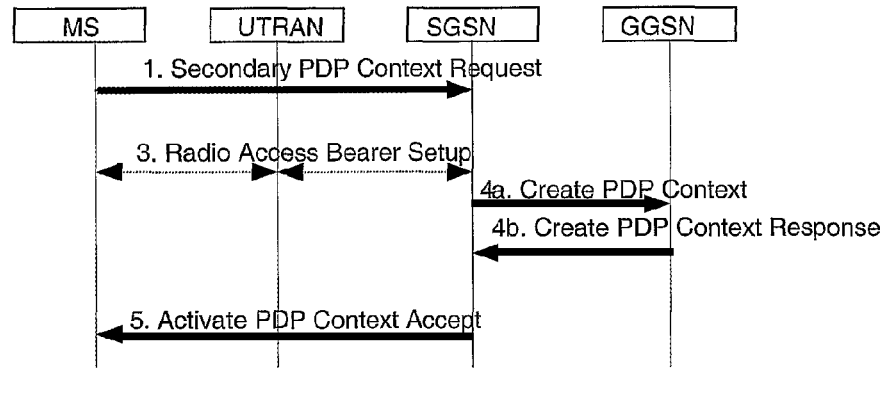

1) The AS sends a push request to the GGSN, asking the GGSN to located the MS and request it to activate a PDP context with a certain QoS, the QoS(R).
2a) The GGSN may send a Send Routing Information for GPRS (IMSI) message to the HLR.
2b) If the HLR determines that the request can be served, it returns a Send Routing Information for GPRS Ack (IMSI, SGSN Address, Mobile Station Not Reachable Reason) message to the GGSN.
3a) The GGSN shall send a PDU Notification Request (IMSI, PDP Type, PDP Address, APN, QoS(R)) message to the SGSN indicated by the HLR.
3b) The SGSN responds with PDU Notification.
4) The SGSN sends a Request PDP Context Activation (TI, PDP Type, PDP Address, APN, QoS(R)) message to request the MS to activate the indicated PDP context.
5) PDP Context Activation as in FIG. 2.
6) Now, a packet data session is open between the Mobile Station (MS) and the Application Server (AS).

Third Embodiment

Figure 8:
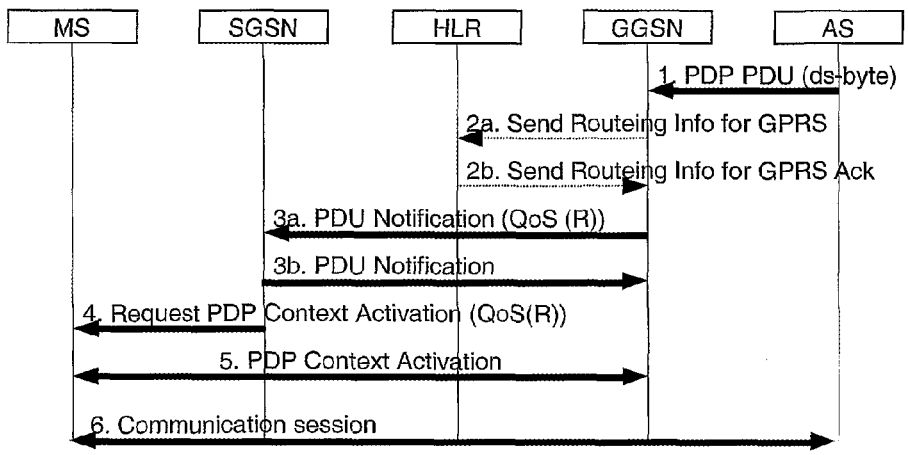

The scenario for setting up a session initiated by an external application server, when QoS is deduced from the incoming PDP PDU sent from the AS to the GGSN, is illustrated by the sequence diagram shown in FIG. 8.

1) A PDP PDU is received in the GGSN. The GGSN reads the QoS information in the packet, e.g., the ds-byte of the IP header (shown in the figure), and maps it to the appropriate QoS(R).
2a) The GGSN may send a Send Routing Information for GPRS (IMSI) message to the HLR.
2b) If the HLR determines that the request can be served, it returns a Send Routing Information for GPRS Ack (IMSI, SGSN Address, Mobile Station Not Reachable Reason) message to the GGSN.
3a) The GGSN shall send a PDU Notification Request (IMSI, PDP Type, PDP Address, APN, QoS(R)) message to the SGSN indicated by the HLR.
3b) The SGSN responds with PDU Notification.
4) The SGSN sends a Request PDP Context Activation (TI, PDP Type, PDP Address, APN, QoS(R)) message to request the MS to activate the indicated PDP context.
5) PDP Context Activation as in FIG. 2.
6) Now, a packet data session is open between the Mobile Station (MS) and the Application Server (AS).

Fourth Embodiment

Figure 9:
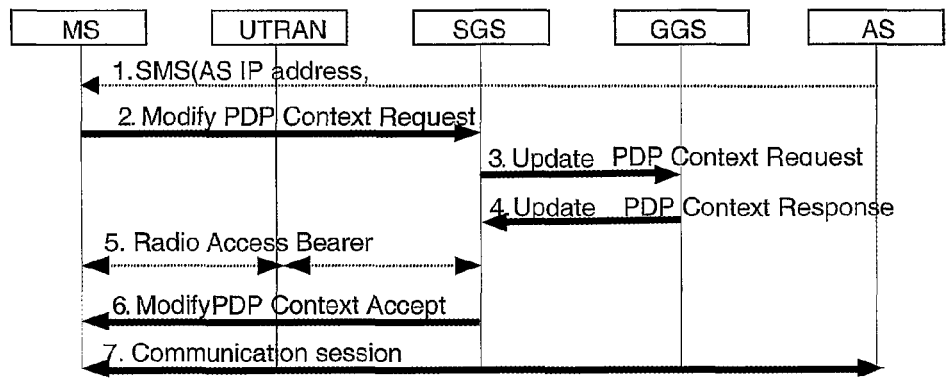

The scenario for modifying an active session, initiated by an external application server, when QoS has been included in the communication between the AS and the MS (by SMS), is illustrated by the sequence diagram shown in FIG. 9:

1) A push request is sent to the MS through an SMS message, asking for a session with a certain QoS, the QoS (R). The MS has an active PDP Context associated with a QoS class. Delivery of the SMS involves the nodes SC, SMS-GMSC, HLR and SGSN.
2) If the QoS of the active PDP Context is not sufficient, the MS may send a Modify PDP Context Request (TI, QoS Requested, TFT) message to the SGSN. Either QoS Requested or TFT or both may be included. QoS Requested indicates the desired QoS profile, while TFT indicates the TFT that is to be added, modified, or deleted from the PDP context.
3) The SGSN may restrict the desired QoS profile given its capabilities, the current load, and the subscribed QoS profile. The SGSN sends an Update PDP Context Request (TEID, NSAPI, QoS Negotiated, TFT) message to the GGSN. If QoS Negotiated and/or TFT received from the SGSN is incompatible with the PDP context being modified (e.g., TFT contains inconsistent packet filters), then the GGSN rejects the Update PDP Context Request. The compatible QoS profiles are configured by the GGSN operator.
4) The GGSN may further restrict QoS Negotiated given its capabilities and the current load. The GGSN stores QoS Negotiated, stores, modifies, or deletes TFT of that PDP context as indicated in TFT, and returns an Update PDP Context Response (TEID, QoS Negotiated) message.
5) In UMTS, radio access bearer modification may be performed by the RAB Assignment procedure.
6) The SGSN selects Radio Priority and Packet Flow Id based on QoS Negotiated, and returns a Modify PDP Context Accept (TI, QoS Negotiated, Radio Priority, Packet Flow Id) message to the MS.
7) Now, a packet data session is open between the Mobile Station (MS) and the Application Server (AS).

Fifth Embodiment

Figure 10:
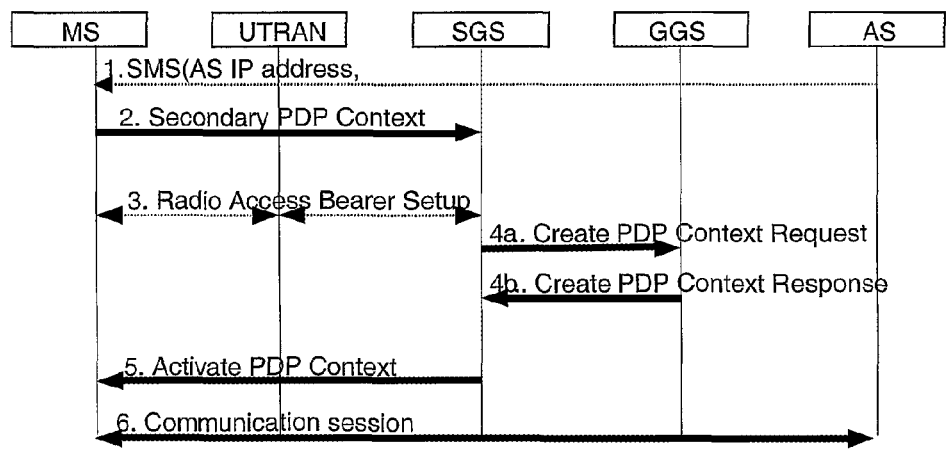

The scenario for setting up a session initiated by an external application server, when QoS has been included in the communication between the AS and the MS (by SMS), is illustrated by the sequence diagram shown in FIG. 10:
1) A push request is sent to the MS through an SMS message, asking for a session with a certain QoS, the QoS (R). The MS has an active PDP Context associated with a QoS class. Delivery of the SMS involves the nodes SC, SMS-GMSC, HLR and SGSN.
2) If the QoS of the active PDP Context is not sufficient, the MS may send an Activate Secondary PDP Context Request (Linked TI, NSAPI, TI, QoS Requested, TFT) message to the SGSN. Linked TI indicates the TI value assigned to any one of the already activated PDP contexts for this PDP address and APN. QoS Requested indicates the desired QoS profile. TFT is sent transparently through the SGSN to the GGSN to enable packet classification for downlink data transfer. TI and NSAPI contain values not used by any other activated PDP context.
In GSM, security functions may be executed.
3) In UMTS, RAB set-up is done by the RAB Assignment procedure.
4a) The SGSN validates the Activate Secondary PDP Context Request using the TI indicated by Linked TI. The same GGSN address is used by the SGSN as for the already-activated PDP context(s) for that TI and PDP address.
The SGSN and GGSN may restrict and negotiate the requested QoS. The SGSN sends a Create PDP Context Request (QoS Negotiated, TEID, NSAPI, Primary NSAPI, TFT) message to the affected GGSN. Primary NSAPI indicates the NSAPI value assigned to any one of the already activated PDP contexts for this PDP address and APN. TFT is included only if received in the Activate Secondary PDP Context Request message. The GGSN uses the same external network as used by the already-activated PDP context(s) for that PDP address, generates a new entry in its PDP context table, and stores the TFT. The new entry allows the GGSN to route PDP PDUs via different GTP tunnels between the SGSN and the external PDP network.
4b) The GGSN returns a Create PDP Context Response (TEID, QoS Negotiated, Cause) message to the SGSN.
In GSM, BSS packet flow context procedures may be executed.
5) The SGSN selects Radio Priority and Packet Flow Id based on QoS Negotiated, and returns an Activate Secondary PDP Context Accept (TI, QoS Negotiated, Radio Priority, Packet Flow Id) message to the MS. The SGSN is now able to route PDP PDUs between the GGSN and the MS via different GTP tunnels and possibly different LLC links.
6) Now, a packet data session is open between the Mobile Station (MS) and the Application Server (AS).

As appears from the above exemplary embodiments, the invention provides for a number of advantages.

By making it possible to send the requested QoS class in connection with the Network Requested PDP Context process, the establishment of a PDP session with an appropriate bandwidth/reliability is facilitated. A possible PDP Context Modification procedure in direct connection to the PDP session initiation is avoided, thus decreasing the amount of signalling required for the Network Requested PDP Context Activation procedure.

According to invention, the Mobile Station (MS) is given an opportunity to choose to set up an appropriate session. This will positively affect at least the network and the mobile station capabilities. Hence, procedures that are more flexible can be built into the mobile station.

ABBREVIATIONS

AS Application Server
APN Access Point Name
ATM Asynchronous Transfer Mode
ATM-SVC ATM-Switched Virtual Circuit
BSS Base Station System
CGF Charging Gateway Functionality
GGSN Gateway GPRS Serving Node
GPRS General Packet Radio System
GSM Global System for Mobile telephony
HLR Home Location Register
IMSI International Mobile Subscriber Identity
IP Internet Protocol
MS Mobile Station
MSC-VLR Mobile Switching Centre
MSISDN MS International ISDN Number
NSAPI Network layer Service Access Point Identifier
PDN Packet Data Network
PDP Packet Data Protocol, e.g., IP
PDU Protocol Data Unit
PLMN Public Land Mobile Network
PS Packet Switched
QoS Quality of Service
RAB Radio Access Bearer
SGSN Serving GPRS Support Node
SM Short Message
SMS Short Message Service
SM-SC Short Message Service Centre
SMS-GMSC Short Message Service Gateway MSC
SMS-IWMSC Short Message Service Interworking MSC
TCP Transmission Control Protocol
TE Terminal Equipment
TEID Tunnel Endpoint IDentifier
TI Transaction Identifier
UMTS Universal Mobile Telephony System
UTRAN UMTS Terrestrial Radio Access Network
Ga Charging data collection interface between a CDR transmitting unit (e.g., an SGSN or a GGSN) and a CDR receiving functionality (a CGF).
Gb Interface between an SGSN and a BSS.
Gc Interface between a GGSN and an HLR.
Gd Interface between a SMS-GMSC and an SGSN, and between a SMS-IWMSC and an SGSN.

Gf Interface between an SGSN and an EIR.
Gi Reference point between GPRS and an external packet data network.
Gn Interface between two GSNs within the same PLMN.
Gp Interface between two GSNs in different PLMNs. The Gp interface allows support of GPRS network services across areas served by the cooperating GPRS PLMNs.
Gr Interface between an SGSN and an HLR.
Gs Interface between an SGSN and an MSC/VLR.
Iu Interface between the RNS and the core network. It is also considered as a reference point.
R Reference point between a non-ISDN compatible TE and MT. Typically this reference point supports a standard serial interface.
Um Interface between the mobile station (MS) and the GSM fixed network part. The Um interface is the GSM network interface for providing GPRS services over the radio to the MS. The MT part of the MS is used to access the GPRS services in GSM through this interface.
Uu Interface between the mobile station (MS) and the UMTS fixed network part. The Uu interface is the UMTS network interface for providing GPRS services over the radio to the MS. The MT part of the MS is used to access the GPRS services in UMTS through this interface.

The invention claimed is:

1. A method for communicating in a packet switched core network supporting several quality of service (QoS) levels, the core network including at least a serving GRPS (General Packet Radio System) support node (SGSN), a gateway GPRS serving node (GGSN), a home location register (HLR), a short message service gateway mobile switching center (SMS-GMSC) and an interworking unit mobile switching center (SMS-IWMSC), charging gateway functionality (CGF), and a public data network (PDN) comprising an application server, the core network being adapted for carrying out at least a mobile initiated packet data protocol (PDP) context activation in which a PDP address is assigned to a mobile station and in which a given QoS is assigned through the network in a communication session between the mobile station and the application server, wherein each given QoS defines a level of performance expectation on the network by the mobile station, said method comprising the steps of:
    initiating a PDP context activation by the application server, in which the application server sends by SMS message a requested QoS class to the mobile station
    receiving from said mobile station a PDP context activation request sent in response to said SMS message including a requested QoS class; and
    establishing the communication session associated with the requested QoS class between said mobile station and the application server using the SGSN and the GGSN within the core network.

2. Method according to claim 1, wherein the PDP context activation request is a PDP activate context request with the requested QoS class.

3. Method according to claim 1, wherein the PDP context activation request is a modify PDP context request with the requested QoS class.

4. Method according to claim 1, wherein the PDP context activation request is an activate secondary PDP context request with the requested QoS class.

5. Method according to claim 1, wherein said SMS message containing the requested QoS class is transmitted from said application server to said mobile station using said short message service gateway mobile switching center (SMS-GMSC) and said interworking unit mobile switching center (SMS-IWMSC) within said core network.

6. Method according to claim 1, wherein the QoS class defines an expected performance level of data transfer or traffic priority within the network for a specified mobile station.

7. Method according to claim 1, wherein the QoS class is defined by throughput and time delay in the transfer of non-real and real-time traffic.

8. Method according to claim 1, wherein the application server sends the requested QoS class with a request for the PDP context activation.

* * * * *

UNITED STATES PATENT AND TRADEMARK OFFICE
CERTIFICATE OF CORRECTION

PATENT NO. : 8,537,754 B2  Page 1 of 2
APPLICATION NO. : 13/090797
DATED : September 17, 2013
INVENTOR(S) : Lundin It is certified that error appears in the above-identified patent and that said Letters Patent is hereby corrected as shown below:

In the Drawings

In Fig. 2, Sheet 1 of 5, delete "5. Create PDP Context Request" and insert -- 5a. Create PDP Context Request --, therefor.

In Fig. 2, Sheet 1 of 5, delete "5. Create PDP Context Response" and insert -- 5b. Create PDP Context Response --, therefor.

In Fig. 4, Sheet 2 of 5, delete " SGSNN " and insert -- SGSN --, therefor.

In Fig. 4, Sheet 2 of 5, in Step 2, delete "updat" and insert -- update --, therefor.

In Fig. 4, Sheet 2 of 5, in Step 3, delete "updat" and insert -- update --, therefor.

In Fig. 9, Sheet 5 of 5, delete " ... " and insert -- ... --, therefor.

In Fig. 10, Sheet 5 of 5, delete " ... " and insert -- ... --, therefor.

In the Specification

In Column 3, Line 48, delete "records" and insert -- records. --, therefor.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,537,754 B2

In Column 3, Line 57, delete "GGSN" and insert -- GGSN. --, therefor.

In Column 4, Line 19, delete "by the an" and insert -- by the --, therefor.

In the Claims

In Column 11, Line 28, in Claim 1, delete "GRPS" and insert -- GPRS --, therefor.

In Column 12, Line 6, in Claim 1, delete "station" and insert -- station; --, therefor.